(12) United States Patent
Dale et al.

(10) Patent No.: US 10,153,494 B2
(45) Date of Patent: Dec. 11, 2018

(54) ELECTRODE HAVING ELECTRICALLY ACTUATED FIBERS FOR ELECTRON CONDUCTION

(71) Applicant: NISSAN NORTH AMERICA, INC., Franklin, TN (US)

(72) Inventors: Nilesh Dale, Novi, MI (US); Jessica Weber, Berkley, MI (US); Ying Liu, Walled Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 336 days.

(21) Appl. No.: 14/976,230

(22) Filed: Dec. 21, 2015

(65) Prior Publication Data

US 2017/0179492 A1  Jun. 22, 2017

(51) Int. Cl.
| | |
|---|---|
| *H01M 10/0525* | (2010.01) |
| *H01M 4/66* | (2006.01) |
| *H01M 4/38* | (2006.01) |
| *H01M 4/04* | (2006.01) |
| *H01M 4/134* | (2010.01) |
| *H01M 4/1395* | (2010.01) |

(Continued)

(52) U.S. Cl.
CPC .......... *H01M 4/66* (2013.01); *H01M 4/0404* (2013.01); *H01M 4/0471* (2013.01); *H01M 4/134* (2013.01); *H01M 4/1395* (2013.01); *H01M 4/386* (2013.01); *H01M 4/624* (2013.01); *H01M 4/625* (2013.01); *H01M 4/663* (2013.01); *H01M 4/82* (2013.01); *H01M 10/0525* (2013.01); *H01M 2004/027* (2013.01); *H01M 2220/20* (2013.01)

(58) Field of Classification Search
None
See application file for complete search history.

(56) References Cited

U.S. PATENT DOCUMENTS

| | | |
|---|---|---|
| 7,000,297 B2 | 2/2006 | Frustaci et al. |
| 7,250,233 B2 | 7/2007 | Choi et al. |
| (Continued) | | |

FOREIGN PATENT DOCUMENTS

WO    9950921 A1    10/1999

OTHER PUBLICATIONS

Klankowski ("A high-performance lithium-ion battery anode based on the core-shell heterostructure of silicon-coated vertically aligned carbon nanofibers". J. Mater. Chem. A, 2013, 1, 1055-1064 (Year: 2013).*

*Primary Examiner* — Sarah A. Slifka
*Assistant Examiner* — Haroon S. Sheikh
(74) *Attorney, Agent, or Firm* — Young Basile Hanlon & MacFarlane, P.C.

(57) ABSTRACT

An electrode has a first active material layer between a current collector and a separator. The first active material layer comprises an active electrode material and electrically actuated fibers extending from a surface of the current collector and into the active electrode material. The electrically actuated fibers have an actuated state, in which the electrically actuated fibers change dimension in a linear direction under application of an electric field, the electrically actuated fibers configured to direct electrons through the active electrode material in a stacked direction of the electrode, and an unactuated state, in which the electrically actuated fibers are conductive but remain in an original state.

10 Claims, 4 Drawing Sheets

(51) Int. Cl.
*H01M 4/62* (2006.01)
*H01M 4/82* (2006.01)
*H01M 4/02* (2006.01)

(56) References Cited

U.S. PATENT DOCUMENTS

| | | |
|---|---|---|
| 7,553,584 B2 | 6/2009 | Chiang et al. |
| 7,972,537 B2 | 7/2011 | Meng et al. |
| 7,988,896 B2 | 8/2011 | Zhang et al. |
| 8,669,008 B2 | 3/2014 | Cho et al. |
| 8,920,978 B1 | 12/2014 | Gross et al. |
| 9,093,693 B2 | 7/2015 | Zhamu et al. |
| 2008/0290554 A1* | 11/2008 | Wu ................... D01D 5/0069 264/211.12 |
| 2009/0176159 A1* | 7/2009 | Zhamu ................ H01M 4/483 429/222 |
| 2010/0297502 A1 | 11/2010 | Zhu et al. |
| 2011/0123866 A1 | 5/2011 | Pan et al. |
| 2011/0186775 A1* | 8/2011 | Shah ..................... C08L 25/02 252/182.32 |
| 2012/0183856 A1 | 7/2012 | Cui et al. |
| 2013/0077515 A1 | 3/2013 | Jung et al. |
| 2014/0023920 A1 | 1/2014 | Yamazaki et al. |
| 2014/0045065 A1 | 2/2014 | Bao et al. |
| 2014/0057179 A1 | 2/2014 | Yushin et al. |
| 2015/0099184 A1* | 4/2015 | Rojeski ................ H01M 4/70 429/231.8 |
| 2015/0221929 A1 | 8/2015 | Lu |

\* cited by examiner

ELECTRODE HAVING ELECTRICALLY ACTUATED FIBERS FOR ELECTRON CONDUCTION

TECHNICAL FIELD

This disclosure relates to an electrode having electrically actuated fibers extending from the current collector and conducting electrons.

BACKGROUND

Hybrid vehicles (HEV) and electric vehicles (EV) use chargeable-dischargeable power sources. Secondary batteries such as lithium-ion batteries are typical power sources for HEV and EV vehicles. Lithium-ion secondary batteries typically use carbon, such as graphite, as the anode electrode. Graphite materials are very stable and exhibit good cycle-life and durability. However, graphite material suffers from a low theoretical lithium storage capacity of only about 372 mAh/g. This low storage capacity results in poor energy density of the lithium-ion battery and low electric mileage per charge.

To increase the theoretical lithium storage capacity, silicon has been added to active materials. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon causes particle cracking and pulverization. This deteriorative phenomenon escalates to the electrode level, leading to electrode delamination, loss of porosity, electrical isolation of the active material, increase in electrode thickness, rapid capacity fade and ultimate cell failure.

SUMMARY

An electrode is disclosed that comprises a first active material layer between a current collector and a separator. The first active material layer comprises an active electrode material and electrically actuated fibers extending from a surface of the current collector and into the active electrode material. The electrically actuated fibers have an actuated state, in which the electrically actuated fibers change dimension in a linear direction under application of an electric field, the electrically actuated fibers configured to direct electrons through the active electrode material in a stacked direction of the electrode, and an unactuated state, in which the electrically actuated fibers are conductive but remain in an original state.

Methods of make the electrode disclosed herein are also disclosed. One method of making the electrode, when the electrically actuated fibers are conductive polymer fibers, comprises adding the conductive polymer fibers to an active material slurry, coating the current collector with the active material slurry with the conductive polymer fibers, actuating the conductive polymer fibers to align the conductive polymer fibers in the coated slurry, and heating the coated current collector to form the first active material layer.

Another method of making the electrode includes attaching electrically actuated fibers to the current collector using conductive adhesive; coating the current collector with a first active material slurry; and heating the coated current collector to form the first active material layer.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Because the carbon material used in electrodes of conventional batteries, such as lithium ion batteries or sodium ion batteries, suffers from a low specific capacity, the conventional battery has poor energy density even though there is small polarization and good stability. Furthermore, batteries having electrodes of graphite or other carbon materials develop increased internal resistance over time, which decreases their ability to deliver current.

To address the poor energy density of carbon based electrodes, alternative active materials with higher energy densities are desired. Alloying particles such as silicon, tin, germanium and their oxides and alloys are non-limiting examples of materials that may be added to an electrode active material layer to improve its energy density, among other benefits.

One particular example is the use of silicon in lithium-ion batteries. Electrode materials such as silicon react with lithium via a different mechanism than graphite. Lithium forms alloys with silicon materials, which involves breaking the bonds between host atoms, causing dramatic structural changes in the process. Since the silicon does not constrain the reaction, anode materials that form alloys can have much higher specific capacity than intercalation electrode materials such as graphite. Silicon based anode active materials have potential as a replacement for the carbon material of conventional lithium-ion battery anodes due to silicon's high theoretical lithium storage capacity of 3500 to 4400 mAh/g. Such a high theoretical storage capacity could significantly enhance the energy density of the lithium-ion batteries. However, silicon active materials suffer from rapid capacity fade, poor cycle life and poor durability. One primary cause of this rapid capacity fade is the massive volume expansion of silicon (typically up to 300%) and structural changes due to lithium insertion. Volume expansion of silicon can cause particle cracking and pulverization when the silicon has no room to expand, which leads to delamination of the active material from the current collector, electrical isolation of the fractured or pulverized active material, capacity fade due to collapsed conductive pathways, and increased internal resistance over time.

Disclosed herein are electrodes designed to counter this increased internal resistance caused by breakdown or expansion of the active material, maintaining conductive pathways throughout the life of the battery. The electrodes have electron actuating fibers that create a path for electrons through the active material layer, creating substantially vertical conductive pathways through the electrode. As used herein, "vertical" refers to the stacking, or layered, direction of the electrode.

Figure 1:
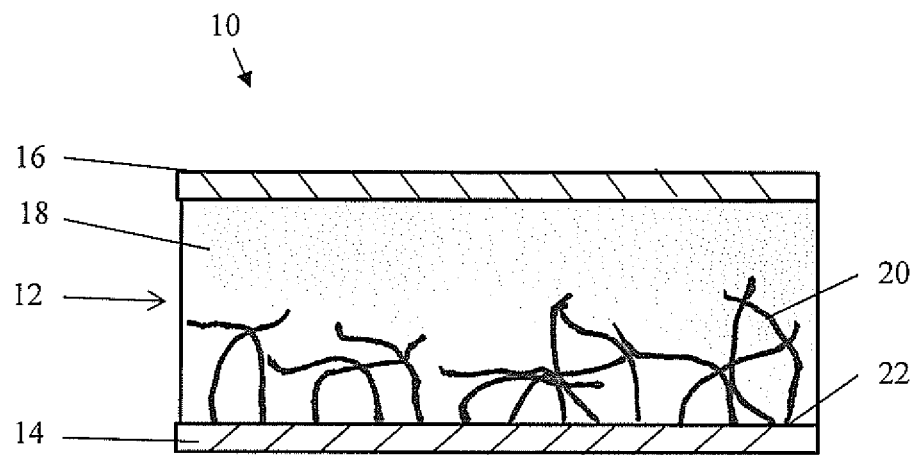
FIG. 1 is a cross sectional view of an electrode having electrically actuated fibers in an original state as disclosed herein.

As illustrated in FIG. 1, an electrode 10 includes a first active material layer 12 between a current collector 14 and a separator 16. The first active material layer 12 comprises an active electrode material 18 and electrically actuated fibers 20 extending from a surface 22 of the current collector 14 and into the active electrode material 18. The electrically actuated fibers 20 have an actuated state, in which the electrically actuated fibers 20 change dimension in a linear direction under application of an electric field. In the actuated state, the electrically actuated fibers 20 direct electrons $e^-$ through the active electrode material 18 in a stacked direction A of the electrode 10. The electrically actuated fibers 20 also have an unactuated state, in which the electrically actuated fibers 20 are conductive but remain in an original state.

The electrically actuated fibers 20 can be conductive polymer fibers or carbon fibers, as non-limiting examples. The electrically actuated fibers 20 can be any material known to those skilled in the art that will change dimension in a linear direction under application of an electric field.

The unactuated state, or original state, of the electrically actuated fibers 20 is one in which the fibers are relaxed, as illustrated in FIG. 1. The electrically actuated fibers 20 may be curved or bent and lying against other electrically actuated fibers 20. Because the fibers 20 are of a conductive material, the fibers 20 are conductive in the unactuated state and do not negatively impact the electrode 10 conductivity when in the unactuated state. Because the electrically actuated fibers 20 are not rigid in the unactuated state, the electrically actuated fibers 20 will not break or warp as the electrode 10 cycles between an operating state and a non-operating state.

The electrically actuated fibers 20 are actuated when a current is flowing through the electrode 10. When conductive polymers are used for the electrically actuated fibers 20, oxidation and reduction reactions change the fiber's electrical conductivity. The electrically actuated fibers 20 can also go through volume expansion which can be controlled in one desired direction by changing composition of the conducting polymer(s) used. The electrically actuated fibers 20 may also be active by temperature changes. For example, the electrically actuated fibers 20 may be actuated when the temperature of the electrode exceeds a threshold temperature and be unactuated when the temperature falls below the threshold temperature.

Figure 2:
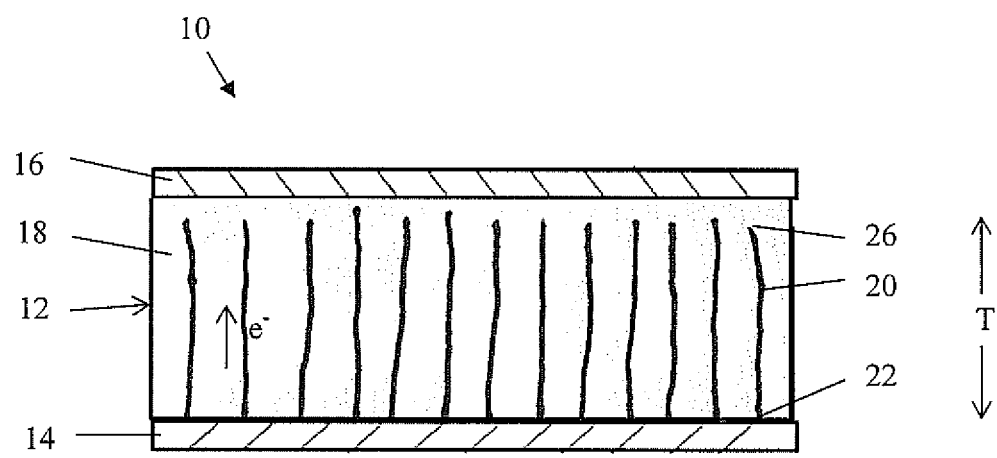
FIG. 2 is a cross sectional view of an electrode having electrically actuated fibers in an actuated state as disclosed herein.

When the electrically actuated fibers 20 are in the actuated state, each electrically actuated fiber 20 changes dimension in a linear direction under application of an electric field, as illustrated in FIG. 2. When in the actuated state, each electrically actuated fiber 20 is spaced from adjacent electrically actuated fibers 20, extending in the vertical direction to direct electrons $e^-$ through the thickness of the first active material layer 12.

Figure 3:
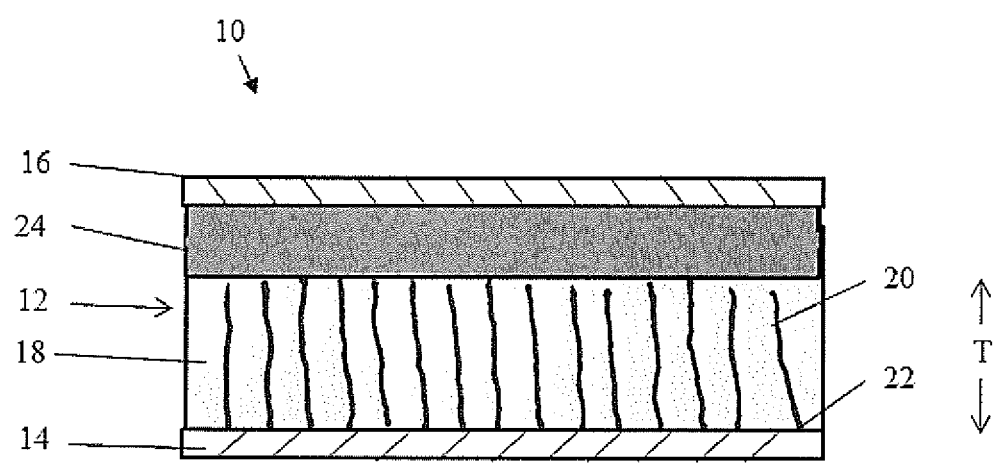
FIG. 3 is a cross sectional view of another embodiment of an electrode having electrically actuated fibers in an actuated state as disclosed herein.

The separator 16 can be a solid separator or a non-solid separator. Non-limiting examples of the separator include porous films of polyolefin such as polyethylene and polypropylene. To ensure the structural integrity of the separator 16, a length of each electrically actuated fiber 20 when in the actuated state is less than a thickness T of the active material layer 12. Thus, each electrically actuated fiber 20 when in the actuated state has a free end 26 spaced from the separator 16. Structural integrity of the separator 16 can be further assured with a second active material layer 24 formed between the first active material layer 12 and the separator 16, as illustrated in FIG. 3. The second active material layer 24 does not contain electrically actuated fibers 20. The active material in the second active material layer can be different than or the same as the active electrode material 18 in the first active material layer 12. The electrically actuated fibers 20 of the first active material layer 12 can have a length equal to or less than the thickness T of the first active material layer 12.

The material of the current collector 14 can be a metal foil such as nickel, iron, copper, aluminum, stainless steel and carbon, as non-limiting examples, as well as any other material known to those skilled in the art for the electrode applications. The current collector 14 can have a thickness in the range of about 5 μm to about 15 μm.

The active electrode material 18 can be silicon, tin or germanium, as non-limiting examples. The silicon material can be silicon, a silicon alloy, a silicon/germanium composite, silicon oxide and combinations thereof. The tin material can be tin, tin oxide, a tin alloy and combinations thereof. Other high energy density materials known to those skilled in the art are also contemplated. The active electrode material 18 can also include a carbon material, which can include one or more of graphene, graphite, surface modified graphite, carbon nanotubes, carbon black, hard carbon, soft carbon and any other carbon materials known to those skilled in the art having the requisite electrochemical activity. A binder may also be used.

Also disclosed is a lithium-ion battery incorporating the electrode 10 disclosed herein as its anode. The power generating element of the lithium-ion battery includes a plurality of unit cell layers each including a cathode active material layer, an electrolyte layer and the anode active material layer 12 disclosed herein. The cathode active material layer is formed on one surface of a current collector 14 and electrically connected thereto and the anode active material layer 18 is formed on the other surface of the current collector 14 and electrically connected thereto. Each of the electrolyte layers includes a separator 16 serving as a substrate and an electrolyte supported by the separator 16.

Examples of the cathode active material layer may include lithium-transition metal composite oxides such as $LiMn_2O_4$, $LiCoO_2$, $LiNiO_2$, $Li(Ni-Co-Mn)O_2$, lithium-transition metal phosphate compounds, and lithium-transition metal sulfate compounds. These are provided by means of example and are not meant to be limiting. As the electrolyte constituting the electrolyte layer, a liquid electrolyte, a gel electrolyte or a polymer electrolyte known to those skilled in the art may be used. As examples, the liquid electrolyte may be in the form of a solution in which a lithium salt is dissolved in an organic solvent. The gel electrolyte may be in the form of a gel in which the above mentioned liquid electrolyte is impregnated into a matrix polymer composed of an ion conductive polymer.

Figure 4:
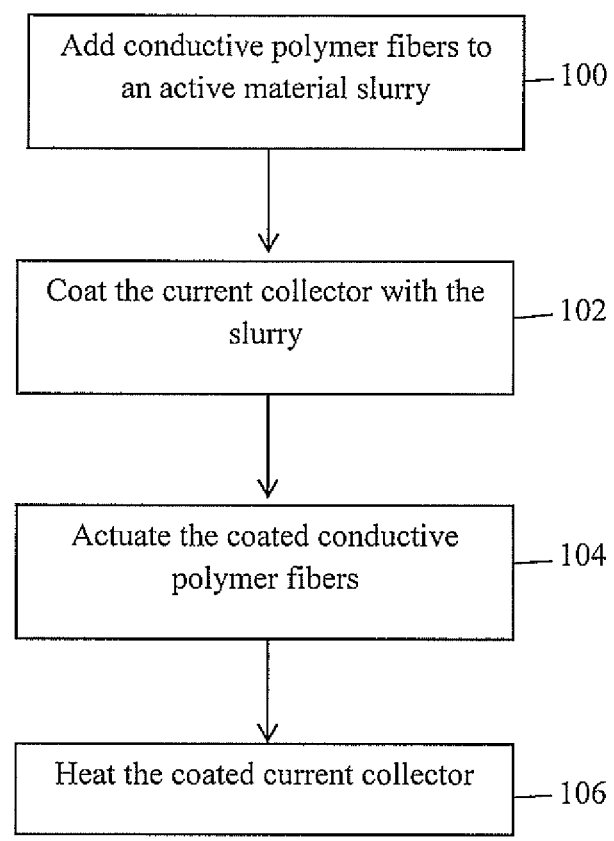
FIG. 4 is a flow diagram of a method of making the electrode disclosed herein.

Also disclosed herein are methods of making the electrode 10 of FIGS. 1-3. The electrically actuated fibers 20 can be conductive polymer fibers. Referring to the flow diagram in FIG. 4, the conductive polymer fibers 20 are added to an active material slurry in step 100. Prior to adding the conductive polymer fibers 20, each should have a length equal to or less than the intended thickness of the first active material layer 12. The current collector 14 is coated with the active material slurry containing the conductive polymer fibers 20 in step 102. Once coated on the current collector 14, the conductive polymer fibers 20 are actuated to align the conductive polymer fibers 20 in the coated slurry in step 104. This initial actuation prior to heating assists in spacing the conductive polymer fibers 20 throughout the active material 18 and aligning the conductive polymer fibers 20 in a substantially vertical direction after the mixing of the slurry. The conductive polymer fibers 20 can be actuated with current flow, as a non-limiting example. The coated current collector 14 is then heated to form the first active material layer 12 in step 106.

The method can further include coating the first active material layer 12 with a second active material slurry to form the second active material layer 24. This can occur before actuating in step 104, before heating in step 106 or after heating of the coated current collector 14. If occurring after heating the first active material layer 12, heating will occur again after the second active material slurry is coated.

Figure 5:
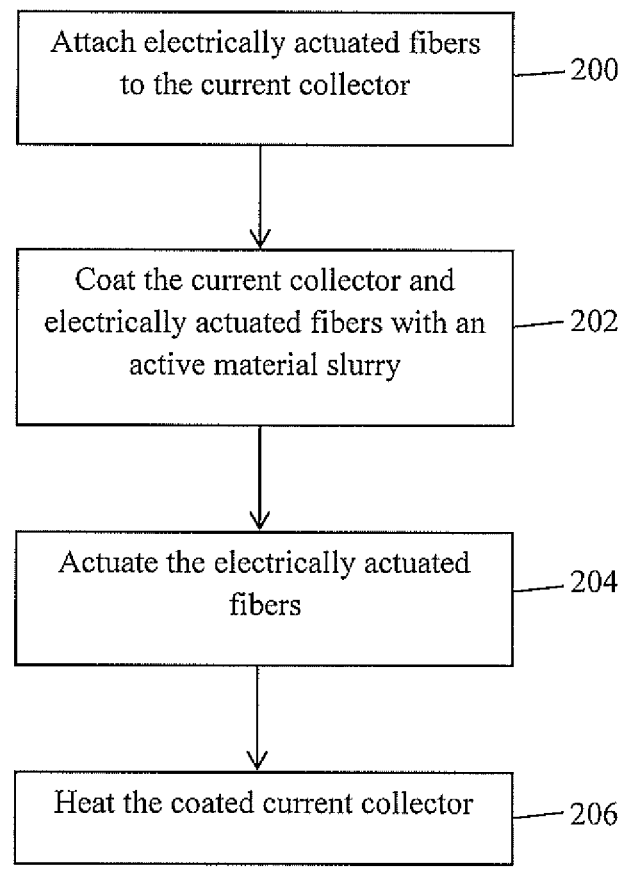
FIG. 5 is a flow diagram of another method of making the electrode disclosed herein.

Another method of making the electrode 10 is illustrated in FIG. 5. In step 200, the electrically actuated fibers 20 are attached to the current collector 14 using conductive adhesive. In step 202, the current collector 14 with the attached electrically conducting fibers 20 is coated with a first active material slurry. The electrically actuated fibers 20 are actuated to align the fibers 20 in the coated slurry in step 204. This initial actuation prior to heating assists in aligning the electrically actuated fibers 20 in a substantially vertical direction after being coated with the slurry. The electrically actuated fibers 20 can be actuated with current flow or a change in temperature, as non-limiting examples, depending on their composition. The coated current collector 14 is then heated to form the first active material layer 12 in step 206.

The method can further include coating the first active material layer 12 with a second active material slurry to form the second active material layer 24. This can occur before actuating in step 204, before heating in step 206 or after heating of the coated current collector 14. If occurring after heating the first active material layer 12, heating will occur again after the second active material slurry is coated.

All combinations of the embodiments are specifically embraced by the present invention and are disclosed herein just as if each and every combination was individually and explicitly disclosed, to the extent that such combinations embrace operable processes and/or devices/systems. In addition, all sub-combinations listed in the embodiments describing such variables are also specifically embraced by the present device and methods and are disclosed herein just as if each and every such sub-combination was individually and explicitly disclosed herein.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A or B, X can include A alone, X can include B alone or X can include both A and B. In addition, the articles "a" and "an" as used in this application and the appended claims should generally be construed to mean "one or more" unless specified otherwise or clear from context to be directed to a singular form.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A lithium-ion battery having an electrode comprising:
   a first active material layer between a current collector and a separator, wherein the first active material layer comprises:
   electrically actuated fibers attached at one end to a surface of the current collector; and
   an active electrode material formed on the current collector between the electrically actuated fibers, the electrically actuated fibers having:
   an actuated state, during operation of the lithium-ion battery, in which the electrically actuated fibers are aligned with respect to each other in a linear direction under application of an electric field, the electrically actuated fibers configured to direct electrons through the active electrode material in a stacked direction of the electrode; and
   an unactuated state, during non-operation of the lithium-ion battery, in which the electrically actuated fibers are conductive but un-aligned with respect to each other.

2. The lithium-ion battery of claim 1, wherein the electrically actuated fibers are conductive polymer fibers.

3. The lithium-ion battery of claim 1, wherein the electrically actuated fibers are carbon fibers.

4. The lithium-ion battery of claim 1, wherein the electrically actuated fibers are configured such that when in the actuated state, each electrically actuated fiber is spaced from adjacent electrically actuated fibers.

5. The lithium-ion battery of claim 1, wherein a length of each electrically actuated fiber when in the actuated state is less than a thickness of the active electrode material.

6. The lithium-ion battery of claim 1, wherein each electrically actuated fiber when in the actuated state has a free end spaced from the separator.

7. The lithium-ion battery of claim 1, wherein the separator is a solid separator.

8. The lithium-ion battery of claim 1, further comprising:
   a second active material layer formed between the first active material layer and the separator, the electrically actuated fibers of the first active material layer each having a length equal to or less than a thickness of the first active material layer.

9. The lithium-ion battery of claim 8, wherein the separator is a non-solid separator.

10. The lithium-ion battery of claim 1, wherein the electrode is an anode and the active electrode material comprises a silicon material and a carbon material.

* * * * *